US012621678B2

(12) United States Patent
Du et al.

(10) Patent No.: US 12,621,678 B2
(45) Date of Patent: May 5, 2026

(54) BEAM MANAGEMENT FOR ANTENNA ARRAY

(71) Applicant: NOKIA SOLUTIONS AND NETWORKS OY, Espoo (FI)

(72) Inventors: Jinfeng Du, West Windsor, NJ (US); Silvio Mandelli, Ludwigsburg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 405 days.

(21) Appl. No.: 18/125,313

(22) Filed: Mar. 23, 2023

(65) Prior Publication Data

US 2023/0328541 A1     Oct. 12, 2023

(30) Foreign Application Priority Data

Apr. 12, 2022     (FI) ..................................... 20225322

(51) Int. Cl.
*H04W 16/28*          (2009.01)
*H04B 7/06*           (2006.01)

(52) U.S. Cl.
CPC .......... *H04W 16/28* (2013.01); *H04B 7/0617* (2013.01)

(58) Field of Classification Search
CPC ... H04W 16/28; H04B 7/0617; H04B 7/0695; H04B 7/06; H01Q 3/24
See application file for complete search history.

(56) References Cited

U.S. PATENT DOCUMENTS

2013/0303145 A1     11/2013 Harrang et al.
2016/0248484 A1      8/2016 Sayeed et al.

2019/0103665 A1*     4/2019 Yoo ......................... H01Q 1/364
2019/0319686 A1*    10/2019 Chen, IV ............. H04B 7/0617
2020/0186228 A1*     6/2020 Raghavan .......... H04B 7/06952
(Continued)

FOREIGN PATENT DOCUMENTS

WO          2020/212730 A1     10/2020

OTHER PUBLICATIONS

Extended European Search Report dated Sep. 8, 2023, corresponding to European Patent Application No. 23162309.1.
(Continued)

*Primary Examiner* — Marcus Smith
*Assistant Examiner* — Raenita Ann Fenner
(74) *Attorney, Agent, or Firm* — SQUIRE PATTON BOGGS (US) LLP

(57)          ABSTRACT

An apparatus, comprising at least one processor, and at least one memory storing instructions, the at least one memory and the instructions configured to, with the at least one processor, cause the apparatus to: determine a power angular spectrum characterizing a power distribution associated with an antenna array in a two-dimensional angular range, determine a beam aiming direction estimation and an associated confidence, determine estimates for an azimuthal angular spread, ASD, and an elevation angular spread, ZSD, determine a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread.

12 Claims, 13 Drawing Sheets

(56) References Cited

U.S. PATENT DOCUMENTS

2021/0409089 A1    12/2021  Haider et al.
2023/0319772 A1*   10/2023  Alawieh  .............. H04W 16/28
                                                              455/456.1

OTHER PUBLICATIONS

Ericsson: "Enhancements of DL-AoD positioning solutions", [Online] Oct. 4, 2021 (Oct. 4, 2021), 3GPP Draft; R1-2110351, 3rd Generation Partnership Project (3GPP), Mobile Competence Centre 650, Route Des Lucioles ; F-06921 Sophia-Antipolis Cedex ; France.
Office Action dated Sep. 15, 2022 corresponding to Finnish Patent Application No. 20225322.
Finnish Search Report dated Sep. 15, 2022 corresponding to Finnish Patent Application No. 20225322.
Office Action dated Feb. 9, 2023 corresponding to Finnish Patent Application No. 20225322.
Vutha Va et al., "The Impact of Beamwidth on Temporal Channel Variation in Vehicular Channels and Its Implications," IEEE Transactions on Vehicular Technology, IEEE, vol. 66, No. 6, pp. 5014-5029, Jun. 2017.
Yoonseong Kang et al., "Optimal Receive Beamwidth for Time Varying Vehicular Channels," In: 2020 IEEE Wireless Communications and Networking Conference (WCNC), IEEE, May 25, 2020.
European Communication pursuant to Article 94(3) EPC, corresponding to EP Application No. 23 162 309.1, dated Feb. 11, 2026.

\* cited by examiner

210 — DETERMINE OBJECTIVE FUNCTION CHARACTERIZING BEST BEAM SHAPE AND BEST BEAM AIMING DIRECTION ACCORDING TO PREDETERMINED CRITERION

OBJ-FUNCT

212 — DETERMINE BEST BEAM SHAPE AND BEST BEAM AIMING DIRECTION BASED ON OBJECTIVE FUNCTION

BS-BEST, AD-BEST

214 — OUTPUT BEST BEAM SHAPE AND BEST BEAM AIMING DIRECTION

BS-BEST, AD-BEST

10' d    d d    12-1-1    12-1-N

12-M-1    12-M-N

230 — DETERMINE n BEST VALUES OF POWER ANGULAR SPECTRUM a1, a2, a3, e1, e2, e3

232 — DETERMINE IF SPECIFIC ONE OF n BEST VALUES EXCEEDS OTHER n-1 MANY BEST VALUES BY PREDETERMINED THRESHOLD

234 — DETERMINE BEAM AIMING DIRECTION ESTIMATION AND ASSOCIATED CONFIDENCE

236 — REPEAT PROCEDURE FOR A PLURALITY OF CLUSTERS

Fig. 14

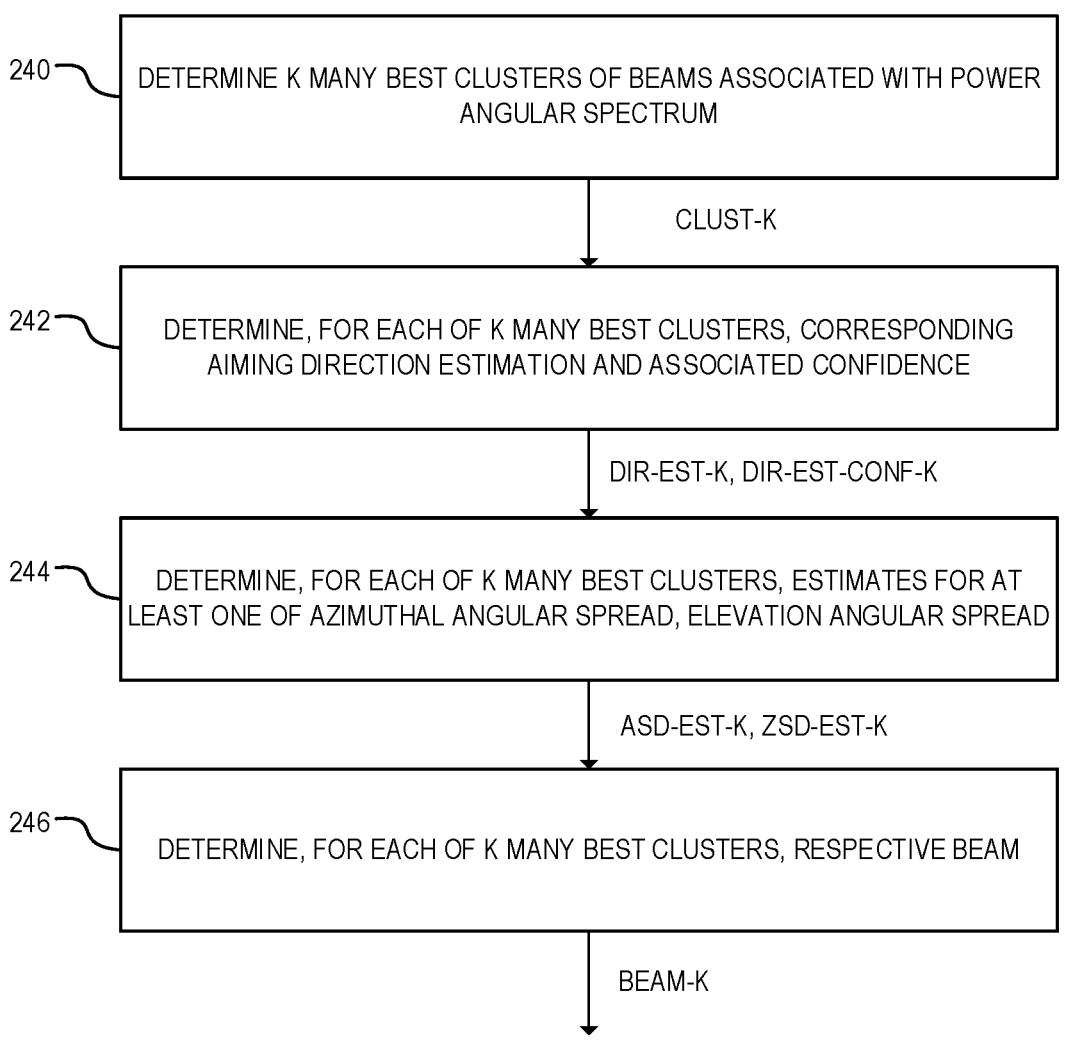

240 — DETERMINE K MANY BEST CLUSTERS OF BEAMS ASSOCIATED WITH POWER ANGULAR SPECTRUM

CLUST-K

242 — DETERMINE, FOR EACH OF K MANY BEST CLUSTERS, CORRESPONDING AIMING DIRECTION ESTIMATION AND ASSOCIATED CONFIDENCE

DIR-EST-K, DIR-EST-CONF-K

244 — DETERMINE, FOR EACH OF K MANY BEST CLUSTERS, ESTIMATES FOR AT LEAST ONE OF AZIMUTHAL ANGULAR SPREAD, ELEVATION ANGULAR SPREAD

ASD-EST-K, ZSD-EST-K

246 — DETERMINE, FOR EACH OF K MANY BEST CLUSTERS, RESPECTIVE BEAM

BEAM-K

100'

102'

MEANS FOR DETERMINING
POWER ANGULAR
SPECTRUM

BEAM MANAGEMENT FOR ANTENNA ARRAY

CROSS REFERENCE TO RELATED APPLICATION

This application claims the benefit of Finnish Patent Application No. 20225322, filed Apr. 12, 2022. The entire content of the above-referenced application is hereby incorporated by reference.

FIELD OF THE DISCLOSURE

Various example embodiments relate to an apparatus comprising at least one processor.

Further embodiments relate to a method of operating related to such apparatus.

BACKGROUND

A growing demand of high-speed wireless transmission drives an expansion of e.g. cellular communication to higher frequency bands such as millimeter waves (mmWave), where comparatively wide spectrum (e.g. hundreds of MHz) is available. Large antenna arrays at mmWave can e.g. be used in 5G communication systems, and they may also be considered to be used with future 6G communication systems, for example in the mid and high frequency bands.

Beam management of large antenna arrays can be complex.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus, comprising at least one processor, and at least one memory storing instructions, the at least one memory and the instructions configured to, with the at least one processor, cause the apparatus to: determine a power angular spectrum characterizing a power distribution associated with an antenna array in a predetermined angular range, determine a beam aiming direction estimation and an associated confidence, determine estimates for at least one of an azimuthal angular spread, ASD, and an elevation angular spread, ZSD, determine a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread. In some embodiments this facilitates beam management for the antenna array and can e.g. contribute to efficiently determine which beam shape(s) to use for the antenna array and/or where to point to with the respective beam(s).

As an example, in some embodiments, the approach according to the principle according to the embodiments enables to provide a solution for joint beam direction finding and beam shape determination, e.g. optimization. In other words, in some embodiments, the problems related to determining which beam shape(s) to use for the antenna array and where to point to with the respective beam(s) may be jointly addressed thus e.g. enabling to efficiently increase a resilience, e.g. against beam misalignment errors, and to obtain an improved directional gain.

In some embodiments, the predetermined angular range can be a one-dimensional angular range (e.g. characterizing one of an azimuth dimension or an elevation dimension) or a two-dimensional angular range (e.g. characterizing an azimuth dimension and an elevation dimension).

In some embodiments, the apparatus may be configured to use a set of directional beams for beam sweeping, e.g. to obtain an estimation of the power angular spectrum (reflecting power distribution over angles), and to identify a, for example best, aiming direction and an associated estimation confidence, as well as angular spread (i.e., ASD and ZSD), e.g. along the identified, for example best, aiming direction. In some embodiments, the beam shape may e.g. be determined by maximizing an effective directional gain by accounting for both angular spread and aiming direction estimate confidence, given the estimated power angular spectrum.

Further details and aspects related to azimuthal angular spread, ASD, and elevation angular spread, ZSD, are disclosed in WO 2020/212730 A1.

In some embodiments, the apparatus may be an apparatus for a wireless communications network, e.g. according to the 5G and/or 6G type or of other types. In some embodiments, the apparatus and/or its functionality may e.g. be provided at a base station, e.g. gNB, for a cellular communications network.

In some embodiments, the instructions, when executed by the at least one processor, cause the apparatus to: determine an objective function characterizing the best beam shape and the best beam aiming direction according to the predetermined criterion, determine the best beam shape and the best beam aiming direction based on the objective function.

In some embodiments, the instructions, when executed by the at least one processor, cause the apparatus to perform beam sweeping, e.g. to determine the power angular spectrum, in a normalized angular frequency domain.

In some embodiments, the normalized angular frequency domain is characterized by $$\phi = \frac{\sin(\theta)}{2},$$

wherein $\phi$ is a normalized angular frequency, wherein $\theta$ characterizes an angle between a boresight direction and a target direction, e.g. "incoming angle" or incident angle, when exemplarily considering an incoming electromagnetic wave.

In some embodiments, the normalized angular frequency domain is characterized by $(\phi_h, \phi_v)$, wherein $$\phi_h = \frac{\sin(\theta_h)}{2} \text{ and } \phi_v = \frac{\sin(\theta_v)}{2}$$

are the normalized angular frequency in azimuth and in elevation, respectively, with $\theta_h$ characterizing an incident angle between a boresight direction and a target direction in azimuth and $\theta_v$ characterizing an incident angle between the boresight direction and the target direction in elevation.

In some embodiments, the instructions, when executed by the at least one processor, cause the apparatus to determine a sampling step size for the beam sweeping in the normalized angular frequency domain based on a number N of antenna elements (e.g., along a first dimension) and a scaling parameter associated with a desired overlap threshold, wherein the desired overlap threshold e.g. characterizes a degree of overlap of adjacent beams during the beam sweeping.

In some embodiments, the instructions, when executed by the at least one processor, cause the apparatus to determine a predetermined number of n many best values associated with the power angular spectrum for the predetermined angular range, determine if a specific one of the n many best values exceeds the other n–1 many best values by a predetermined threshold, determine the beam aiming direction estimation and the associated confidence based on the determination.

In some embodiments, the instructions, when executed by the at least one processor, cause the apparatus to repeat the steps of determining the predetermined number of n many best values associated with the power angular spectrum for the predetermined angular range, determining if a specific one of the n many best values exceeds the other n–1 many best values by a predetermined threshold, determining the beam aiming direction estimation and the associated confidence based on the determination, for a plurality of clusters of beams associated with the power angular spectrum.

In some embodiments, the instructions, when executed by the at least one processor, cause the apparatus to determine K many best clusters of beams associated with the power angular spectrum (as e.g. obtained by the beam sweeping), determine, for each of the K many best clusters of beams, a corresponding aiming direction estimation and an associated confidence, determine, for each of the K many best clusters of beams, estimates for at least one of an azimuthal angular spread, ASD, and an elevation angular spread, ZSD, determine, for each of the K many best clusters of beams, a respective beam.

In some embodiments, the instructions, when executed by the at least one processor, cause the apparatus to determine, based on the power angular spectrum, whether there is more than one dominant arrival cluster associated with the power angular spectrum, and to determine the objective function based on the determination, whether there is more than one dominant arrival cluster. In some embodiments, this enables to select a suitable objective function for each of the different operational cases.

In some embodiments, the instructions, when executed by the at least one processor, cause the apparatus to determine at least one of the best beam shape and the best beam aiming direction based on at least one of the following elements: a) Reference Signal Strength Indicator, RSSI, b) Reference Signal Received Power, RSRP, c) Reference Signal Received Quality, RSRQ, d) Signal to Noise Ratio, SNR, e) Signal to Interference plus Noise Ratio, SINR.

Further exemplary embodiments relate to an apparatus comprising means for determining a power angular spectrum characterizing a power distribution associated with an antenna array in a predetermined, for example one-dimensional or two-dimensional, angular range, determining a beam aiming direction estimation and an associated confidence, determining estimates for an azimuthal angular spread, ASD, and an elevation angular spread, ZSD, determining a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread.

Further exemplary embodiments relate to a method comprising: determining a power angular spectrum characterizing a power distribution associated with an antenna array in a predetermined angular range, determining a beam aiming direction estimation and an associated confidence, determining estimates for an azimuthal angular spread, ASD, and an elevation angular spread, ZSD, determining a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread.

Further exemplary embodiments relate to a device for wireless applications, comprising at least one apparatus according to the embodiments. In some embodiments, the device may e.g. be provided for, e.g. within, a base state, e.g. gNB, of a communications system. In some embodiments, the device may e.g. be provided for, e.g. within, a terminal device of a communications system.

Further exemplary embodiments relate to a data carrier signal carrying and/or characterizing the instructions of any of the claims 1 to 11. In some embodiments, the instructions may e.g. be provided in the form of at least one computer program.

Further exemplary embodiments relate to a wireless communication system comprising at least one device according to the embodiments.

Further embodiments relate to a computer program or computer program product comprising instructions which, when the program is executed by a computer, cause the computer to carry out the method according to the embodiments.

DESCRIPTION OF SOME EXEMPLARY EMBODIMENTS

Figure 1:
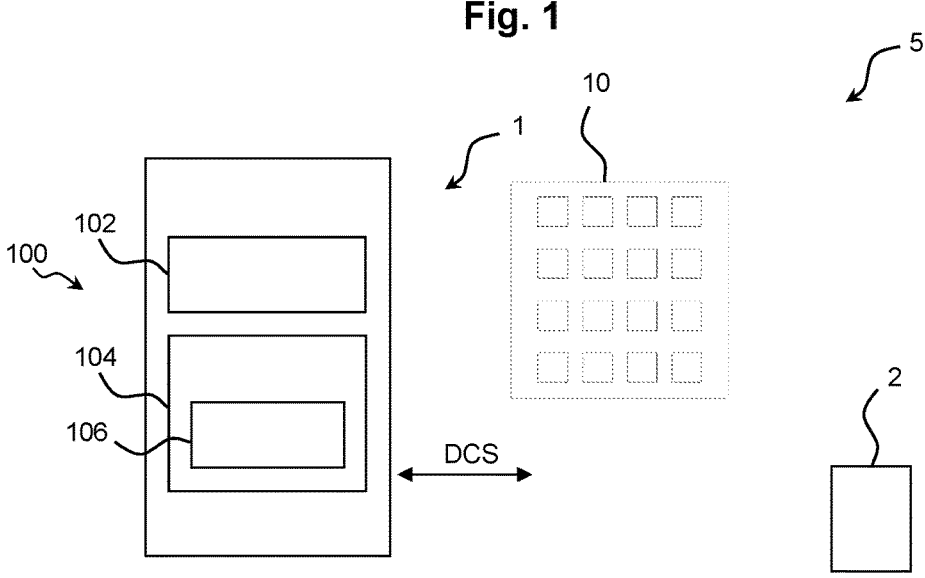
FIG. 1 schematically depicts a simplified block diagram according to some embodiments, FIG. 2 schematically depicts a simplified flow chart according to some embodiments, FIG. 3 schematically depicts a simplified flow chart according to some embodiments, FIG. 4 schematically depicts a simplified rectangular antenna array according to some embodiments, FIG. 5 schematically depicts a simplified flow chart according to some embodiments, FIG. 6 schematically depicts a simplified flow chart according to some embodiments, FIG. 7 schematically depicts a beam overlapping level according to some embodiments, FIG. 8A schematically depicts exemplary aspects of beam sweeping according to some embodiments, FIG. 8B schematically depicts exemplary aspects of beam sweeping according to some embodiments, FIG. 9A schematically depicts exemplary aspects of beam sweeping according to some embodiments, FIG. 9B schematically depicts exemplary aspects of beam sweeping according to some embodiments, FIG. 10 schematically depicts exemplary aspects of beam sweeping according to some embodiments, FIG. 11 schematically depicts a simplified flow chart according to some embodiments, FIG. 12 schematically depicts exemplary aspects of beam sweeping according to some embodiments, FIG. 13 schematically depicts a simplified flow chart according to some embodiments, FIG. 14 schematically depicts a simplified flow chart according to some embodiments, FIG. 15 schematically depicts a simplified flow chart according to some embodiments, FIG. 16 schematically depicts a simplified flow chart according to some embodiments, FIG. 17 schematically depicts a simplified flow chart according to some embodiments, FIG. 18 schematically depicts a simplified flow chart according to some embodiments, FIG. 19 schematically depicts a simplified block diagram according to some embodiments.

Some embodiments, see FIG. 1, relate to an apparatus 100, comprising at least one processor 102, and at least one memory 104 storing instructions 106, e.g. in form of at least one computer program, the at least one memory 104 and the instructions 106 configured to, with the at least one processor 102, cause the apparatus 100 to: determine 200 (FIG. 2) a power angular spectrum PAS characterizing a power distribution associated with an antenna array 10 (FIG. 1) in a predetermined angular range (e.g., by performing beam sweeping), determine 202 (FIG. 2) a beam aiming direction estimation DIR-EST and an associated confidence DIR-EST-CONF, determine 204 estimates ASD-EST, ZSD-EST for at least one of an azimuthal angular spread, ASD, and an elevation angular spread, ZSD, determine 206 a best beam shape BS-BEST and best beam aiming direction AD-BEST according to a predetermined criterion (see for example FIG. 18, block 260, for an exemplary criterion) based on at least one of a) the power angular spectrum PAS, b) the beam aiming direction estimation DIR-EST and the associated confidence DIR-EST-CONF, c) the estimate ASD-EST for the azimuthal angular spread, d) the estimate ZSD-EST for the elevation angular spread. In some embodiments this facilitates beam management for the antenna array 10 (FIG. 1) and can e.g. contribute to efficiently determine which beam shape(s) to use for the antenna array 10 and/or where to point to with the respective beam(s).

As an example, in some embodiments, the approach according to the principle according to the embodiments enables to provide a solution for joint beam direction finding and beam shape determination, e.g. optimization. In other words, in some embodiments, the problems related to determining which beam shape(s) to use for the antenna array 10 and where to point to with the respective beam(s) may be jointly addressed thus e.g. enabling to efficiently increase a resilience, e.g. against beam misalignment errors, and to obtain an improved directional gain, e.g. when using the antenna array 10.

In some embodiments, the predetermined angular range can be a one-dimensional angular range (e.g. characterizing one of an azimuth dimension or an elevation dimension) or a two-dimensional angular range (e.g. characterizing an azimuth dimension and an elevation dimension).

Figure 2:
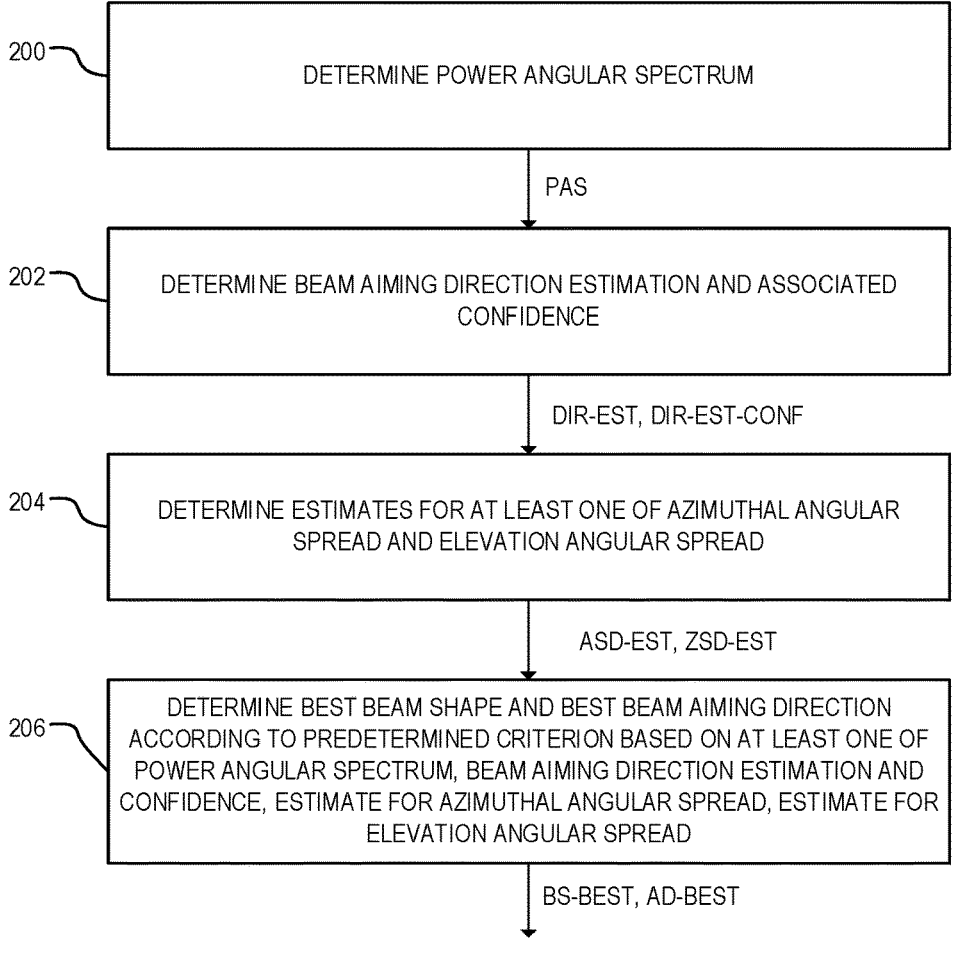

In some embodiments, FIG. 1, the apparatus 100 may be configured to use a set of directional beams for beam sweeping, e.g. to obtain an estimation of the power angular spectrum (reflecting power distribution over angles), see for example block 200 of FIG. 2, and to identify a, for example best, aiming direction and an associated estimation confidence, as well as angular spread (i.e., ASD and ZSD), e.g. along the identified, for example best, aiming direction. In some embodiments, the beam shape may e.g. be determined by maximizing an effective directional gain by accounting for both angular spread and aiming direction estimate confidence, given the estimated or determined power angular spectrum PAS.

In some embodiments, FIG. 1, the apparatus 100 may be an apparatus for a wireless communications network 5, such as e.g. according to the 5G and/or 6G type or of other types. In some embodiments, the apparatus 100 and/or its functionality may e.g. be provided at a base station, e.g. gNB, for a cellular communications network.

Figure 3:
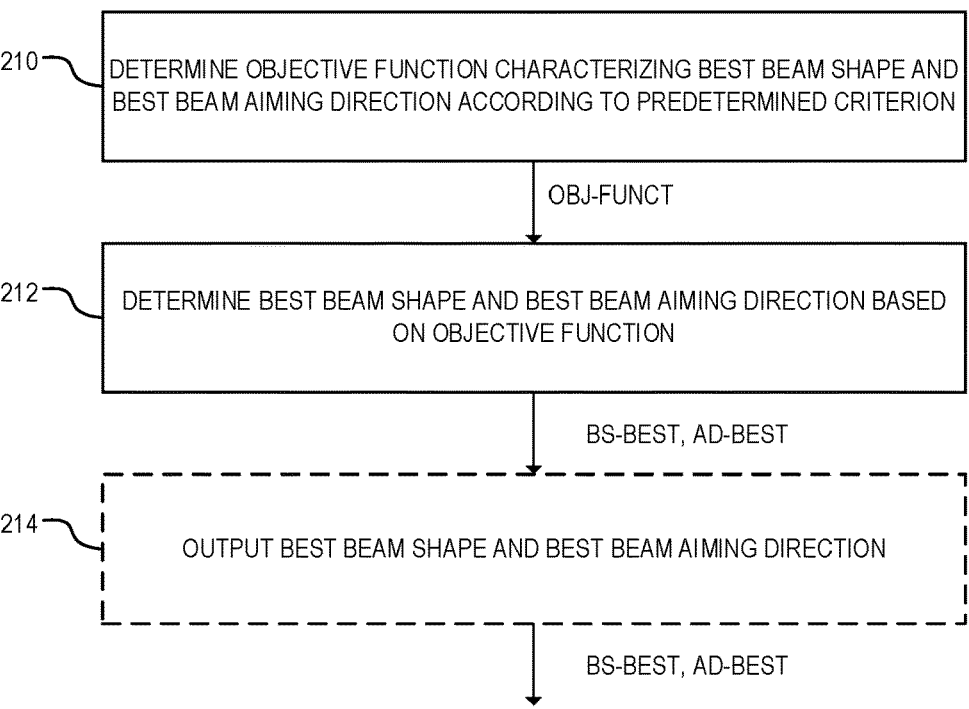

In some embodiments, FIG. 3, the instructions 106, when executed by the at least one processor 102, cause the apparatus 100 to: determine 210 an objective function OBJ-FUNCT characterizing the best beam shape and the best beam aiming direction according to the predetermined criterion, determine 212 the best beam shape BS-BEST and the best beam aiming direction AD-BEST based on the objective function OBJ-FUNCT. In some embodiments, optionally, the so obtained best beam shape BS-BEST and/or best beam aiming direction AD-BEST may e.g. be output 214, e.g. for use with the antenna array 10 (FIG. 1), e.g. for wireless data transmissions between a gNB and one or more terminal devices 2 (e.g., user equipment).

Figure 4:
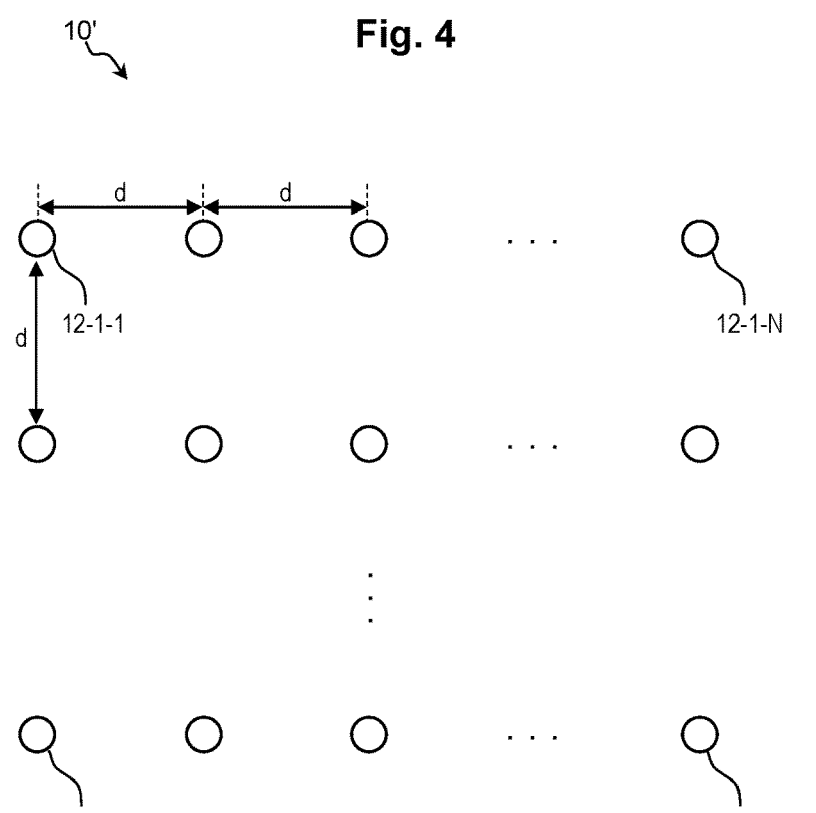

In some embodiments, FIG. 4, the antenna array 10 of FIG. 1 may e.g. comprise a, for example uniform, rectangular array, URA, 10' as exemplarily depicted by FIG. 4. The URA 10' has a matrix-type arrangement with N many rows and M many columns of equally spaced antenna elements 12-1-1, . . . , 12-1-N, . . . , 12-M–1, . . . , 12-M–N, wherein reference sign d symbolizes a spacing distance.

In some embodiments, FIG. 1, the antenna array 10 of FIG. 1 may e.g. comprise a, for example uniform, linear array, ULA, which is not shown in FIG. 1, but which may e.g. comprise an exemplary structure similar or identical to e.g. one row or column of the matrix-type arrangement of the URA 10' of FIG. 4.

It is noted that the principle according to the embodiments may e.g. be applied to one-dimensional antenna arrays and/or two-dimensional antenna arrays.

In the following, exemplary embodiments related to joint beam aiming and beam shape optimization, e.g. for a base station, e.g. gNB, are disclosed with reference to FIG. 5. The exemplary embodiment of FIG. 5 e.g. enables to jointly optimize beam aiming and beam shape based on the aiming direction estimate DIR-EST and its confidence DIR-EST-CONF (see for example also block 202 of FIG. 2), ASD and ZSD estimates ASD-EST, ZSD-EST (see, for example also block 204 of FIG. 2) as well as the estimated power angular spectrum PAS (see, for example also FIG. 2), e.g. to tradeoff between an effective gain and a robustness, e.g. against misalignment (i.e., high confidence in direction estimation needs narrower beam, and low confidence in aiming direction would need wider beam for robustness). Element E1 of FIG. 5 symbolizes performing beam sweeping in azimuth and in elevation, to determine a power angular spectrum estimation. Element E2 symbolizes determining, e.g. identifying, a best beam aiming direction estimation and its confidence. Element E3 symbolizes determining estimates for ASD and ZSD, e.g. along an identified aiming direction as e.g. obtained based on block E2. Element E4 symbolizes determining a beam shape and aiming direction that jointly provide a highest, for example, received signal power (or SNR, or SINR, or RSRQ, see also FIG. 18), given power angular spectrum, angular spread, and direction estimation confidence (e.g. accounting for both beam shape matching gain and potential beam misalignment penalty), for example, using the principle according to the embodiments.

Element E5 symbolizes determining whether a beam as characterized by the beam shape and aiming direction as obtained by block E4 is available, e.g. can be provided using the array antenna 10 (FIG. 1). If so, this beam can be used, e.g. to serve at least one UE 2 (FIG. 1), see element E6. If the determination E4 yields that such beam is not available, e.g. cannot be provided using the array antenna 10 (FIG. 1), the procedure transitions to element E7, which symbolizes finding a best beam available (e.g., using a Grid of Beams, GoB, technique), e.g. an available beam which is at least similar to the best beam as determined by block E4, e.g. in respect of the beam shape and/or the aiming direction. In some embodiments, block E7 may propose to find the best GoB beam of the antenna array 10, e.g. the beam with the highest estimated received signal power (or, for example, SNR (or other performance criterion)), e.g. given angular spread and direction estimation confidence as provided by elements E2, E3. In some embodiments, the exemplary approach according to FIG. 5 may e.g. outperform conventional beam management approaches by, for example, several dB.

In the following, further exemplary embodiments and aspects according to further exemplary embodiments are disclosed, which, in further exemplary embodiments, may be combined with any of the aforementioned embodiments.

Also note that, in some embodiments, the principle according to the embodiments may e.g. be extended to support hybrid beamforming, e.g. with multiple concurrent beams.

Further, note that the principle according to the embodiments works both in an uplink direction, e.g. by using different beams to monitor uplink signals from UE 2 (FIG. 1), and/or in a downlink direction, e.g. by using different beams to transmit downlink signals to the UE 2, and then e.g. performing estimates as exemplarily mentioned above based on UE feedback.

In the following, further exemplary embodiments and aspects e.g. related to beam sweeping are disclosed. As mentioned above, in some embodiments, beam sweeping may e.g. be used to determine the power angular spectrum PAS, see for example block 200 of FIG. 2.

In some embodiments, beam sweeping may e.g. be performed in the angular domain, where for example a predefined set of beams that span over an entire range to be considered, e.g. a desired field of view, FoV, either at a fixed angular step size (say every 10°, thus uniform in angular domain) or at some empirically chosen angular directions (typically non-uniform in angular domain, such as using beams from a predefined GoB codebook).

In some embodiments, it is proposed to arrange probing beams for beam sweeping in a transformed angular domain, also referred to as Normalized Angular Frequency (NAF) φ domain hereafter, e.g. such that fewer probing beams (and thus lower overhead) are needed, as compared to uniform beam sweeping in the angular domain.

Figure 5:
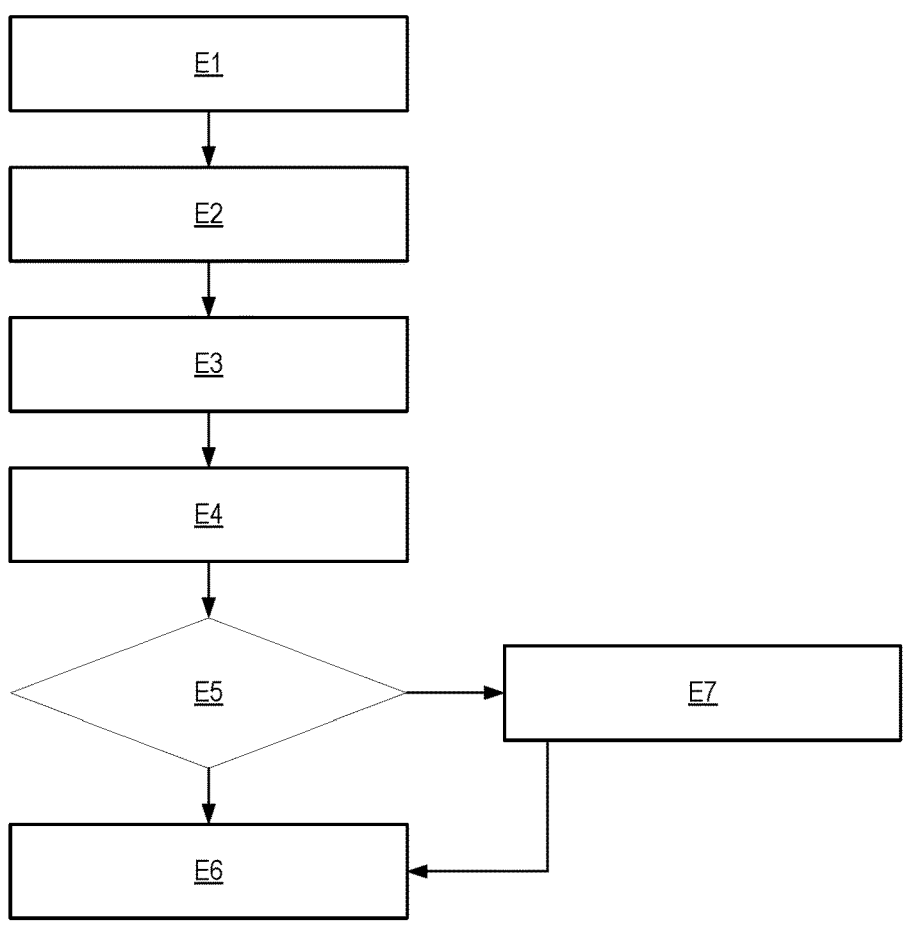

As an example, in some embodiments, FIG. 5, the instructions 106 (FIG. 1), when executed by the at least one processor 102, cause the apparatus 100 to perform 222 beam sweeping SWEEP-NAF, e.g. to determine the power angular spectrum PAS, in a normalized angular frequency, NAF, domain.

In some embodiments, the normalized angular frequency domain is characterized by $$\phi = \frac{\sin(\theta)}{2},$$

8 wherein φ is a normalized angular frequency, wherein θ characterizes an angle between a boresight direction and a target direction, e.g. "incoming angle" or incident angle, when exemplarily considering an incoming electromagnetic wave.

In some embodiments, it is proposed to arrange probing beams uniformly in the NAF domain with spacing, for example, at most $$\frac{\lambda}{2dN},$$

where N is a number of antenna elements in an exemplarily considered ULA array, d is a spacing between adjacent elements, and λ is a wavelength, which e.g. enables to reconstruct (e.g., perfectly, in the absence of noise) a full angular response.

In some embodiments, a uniform sampling in the NAF domain is used to ensure an angular response reconstruction capability, and to control a beam overlapping between neighboring probing beams, e.g. for the beam sweeping, e.g. such that all probing beams overlap with respective neighbors at a same desired beam overlapping threshold (i.e., a drop-off level from their respective beam pointing direction, in a same way as e.g. a 3 dB drop-off from both sides of a beam boresight, defines the half power beam width (HPBW)).

In some embodiments, FIG. 5, the instructions 106, when executed by the at least one processor 102, cause the apparatus 100 to determine 220 a sampling step size SSS-NAF for the beam sweeping in the normalized angular frequency (NAF) domain based on a number N of antenna elements (e.g., along a first dimension) and a scaling parameter α associated with a desired overlap threshold, wherein the desired overlap threshold e.g. characterizes a degree of overlap of adjacent beams during the beam sweeping.

In the following, further exemplary embodiments and aspects e.g. related to beam sweeping with a uniform step size in the NAF domain are disclosed, wherein e.g. a universal and predetermined beam overlapping threshold may be attained.

While some of the exemplarily disclosed embodiments are, for the sake of simplicity, explained with respect to a one-dimensional case, e.g. related to ULA, according to further embodiments, the principle of the embodiments may, without loss of generality, also be applied to two-dimensional antenna arrays such as e.g. URA, see FIG. 4.

In some embodiments, for an exemplarily considered N-element ULA spacing d at half-wavelength, e.g. d=λ/2, a beam pattern (measured as irradiated power to the angle θ, or equivalently in the NAF domain $$\phi = \frac{\sin(\theta)}{2})$$

of a beam pointing towards the boresight of the array can be characterized by $$f(\phi, 0) = \left(\frac{\sin(N\pi\phi)}{N * \sin(\pi\phi)}\right)^2, \phi \in \left[-\frac{1}{2}, \frac{1}{2}\right].$$

In some embodiments, a beam pattern of a beam pointing at $\Delta$ (or shifted by $\Delta$) in the NAF domain can be characterized by $$f(\phi, \Delta) = \left(\frac{\sin(N\pi(\phi - \Delta))}{N * \sin(\pi(\phi - \Delta))}\right)^2, \phi \in \left[-\frac{1}{2}, \frac{1}{2}\right).$$

In some embodiments, e.g. for uniform sampling in the NAF domain, e.g. with step size $$0 < \delta \le \frac{2}{N},$$

the beam pattern of a beam pointing at $k\delta, k=0,\pm 1, \pm 2, \dots$, can therefore be characterized by $$f(\phi, k\delta) = \left(\frac{\sin(N\pi(\phi - k\delta))}{N * \sin(\pi(\phi - k\delta))}\right)^2.$$

In some embodiments, e.g. to ensure universal beam overlapping between at least some, for example all, neighboring probing beams, $f(\phi, k\delta) = f(\phi, (k-1)\delta)$ is proposed, which has one unique root within a main beam of the two neighboring probing beams, i.e., the overlapping location is at a half point between two consecutive beams at $$\phi = \left(k - \frac{1}{2}\right)\delta$$

with a beam overlapping level at $$\text{overlap\_threshold } (\delta, N) = \left(\frac{\sin\left(\frac{\delta}{2}N\pi\right)}{N * \sin\left(\frac{\delta}{2}\pi\right)}\right)^2, 0 < \delta \le \frac{2}{N}.$$

Figure 8A:
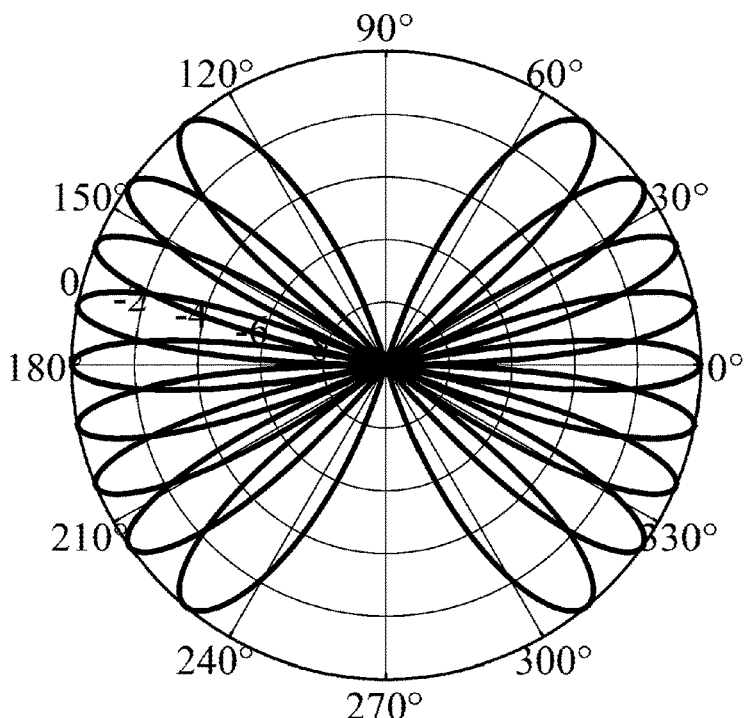

In some embodiments, the same beam overlapping threshold may be achieved between all probing beams (thus universal) and it is determined by the beam size N and NAF domain sampling step size $\delta$ (thus controllable and predetermined by adjusting $\delta$), as e.g. shown in FIG. 8A, 8B explained further below.

Since $$0 < \delta \le \frac{2}{N},$$

in some embodiments, a scaling parameter $0 < \text{alpha} \le 2$ can be introduced, e.g. such that $$\delta = \frac{\text{alpha}}{N},$$

which leads to $$\text{overlap\_threshold (alpha, } N) = \left(\frac{\sin\left(\frac{\text{alpha}}{2}\pi\right)}{N * \sin\left(\frac{\text{alpha}}{2N}\pi\right)}\right)^2, 0 < \text{alpha} \le 2.$$

Figure 7:
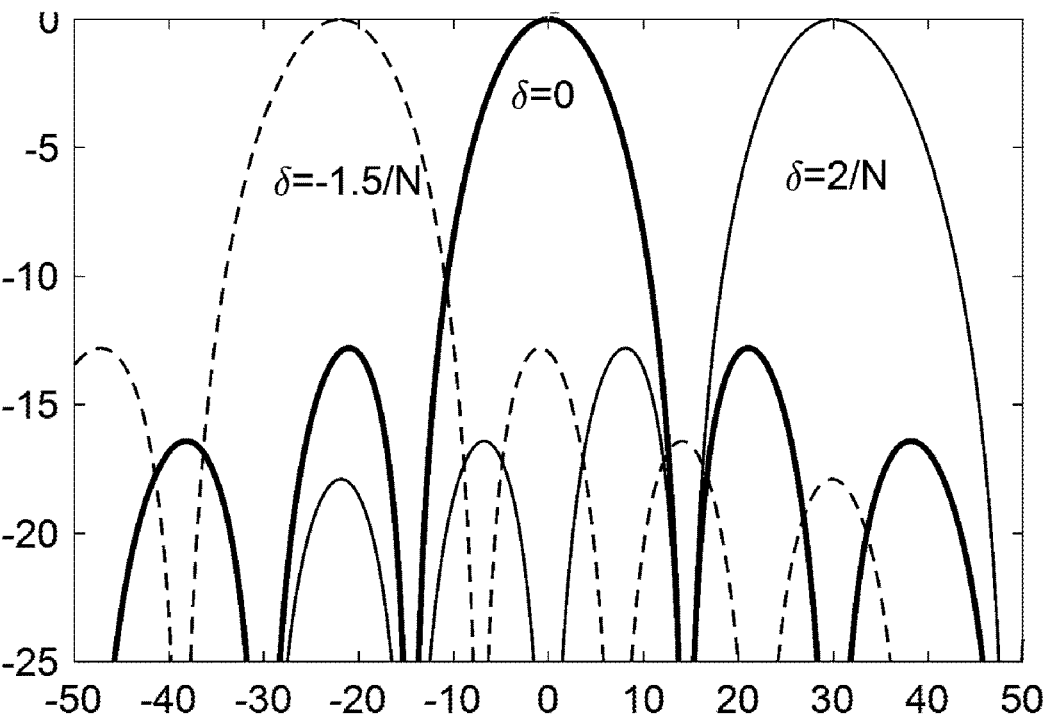

This equation has 3 unknowns: alpha, N, and the overlapping threshold "overlap_threshold". Therefore, in some embodiments, alpha may be determined, e.g. for a given array size N and a given beam overlap threshold. An illustration of exemplary beam overlapping for different values of the scaling parameter alpha is shown in FIG. 7. In FIG. 7, beam overlapping levels between neighboring probing beams for an exemplary N=8 element ULA with half-wavelength spacing are shown, wherein the horizontal axis characterizes an angle, and wherein the vertical axis characterizes a normalized power in dB.

In further embodiments, an extension to e.g. ULA with a general spacing $$d \ne \frac{\lambda}{2}$$

is also possible.

In some embodiments, an efficient and/or fast numerical solution to determine alpha is proposed as follows:

Since overlap_threshold(alpha,N) is monotonic w.r.t. $0 < \text{alpha} \le 2$, according to some embodiments, a bisection method can be used to determine alpha efficiently.

In some embodiments, a, for example good, closed-form approximation for alpha can be used, e.g. to initialize the searching: for a given beam overlapping threshold $\gamma \overset{\text{def}}{=}$ overlap_threshold(alpha,N)<1, one can e.g. initialize the bisection by $$\frac{2}{\pi}\sqrt{6\left(1 - \sqrt{\gamma}\right)} < \text{alpha} \le 2,$$

where the left-hand-side is obtained by applying the inequality $$x - \frac{x^3}{6} < \sin(x) < x$$

for $0 < x < \pi/2$.

In further embodiments, which may e.g. be related to beam scan design metrics, for example, if FoV is a key metric, probing beams within the FoV [+/−FoV] may e.g. be focused, e.g. using a smaller step size in the NAF domain, with step size $$\frac{\text{alpha}}{N} = \frac{\sin(FoV)}{(N + 1)}.$$

One example for an 8-element ULA with desired FoV of +/−60° according to further exemplary embodiments is illustrated in As mentioned above, FIG. 8A, 8B FIG. 8A.

In further embodiments, for example, if beam overlapping is a key metric, the step size $$\frac{alpha}{N}$$

may e.g. be determined by obtaining alpha numerically from $\gamma$=overlap_threshold(alpha, N).

In some embodiments, e.g. if both the beam overlapping and the FoV are key metrics, first, alpha may e.g. be determined numerically, e.g. as described above, and then M=ceil(N*sin(FoV)/alpha−1) may be obtained. In some embodiments, a sampling step size in the NAF domain is given by $$\frac{alpha}{M}.$$

Figure 8B:
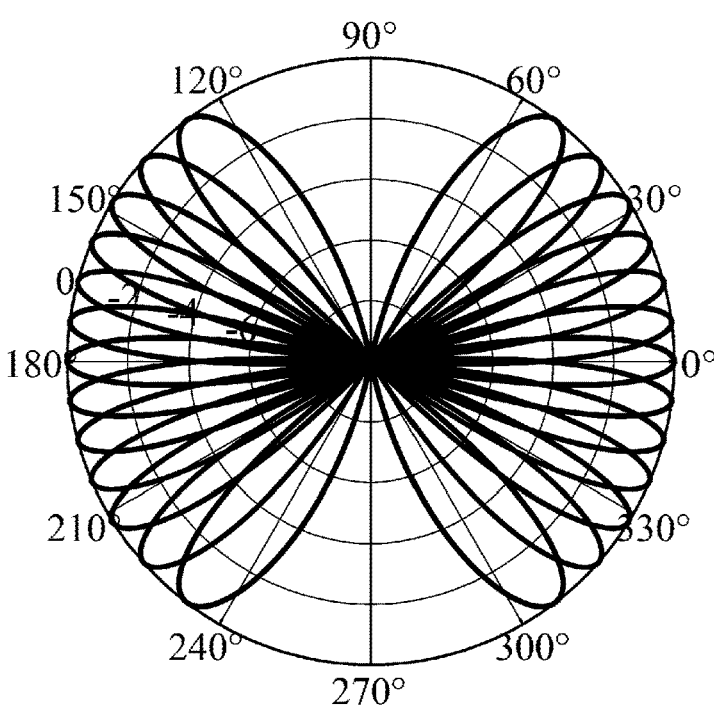

One example tor an 8-element ULA with a desired beam overlapping of −1 dB within the FoV of +/−60° is illustrated in FIG. 8B.

As mentioned above, FIG. 8A, 8B illustrate exemplary proposed beam sweeping methods over an exemplary FoV of +/−60°, e.g., for an 8-element ULA at half-wavelength spacing, e.g. with a universal and predetermined beam overlapping threshold: FIG. 8A: step size of 0.77/N in NAF with beam overlapping at −2.2 dB using 9 beams; FIG. 8B: step size of 0.53/N in NAF with beam overlapping at −1 dB using 13 beams.

Figure 9A:
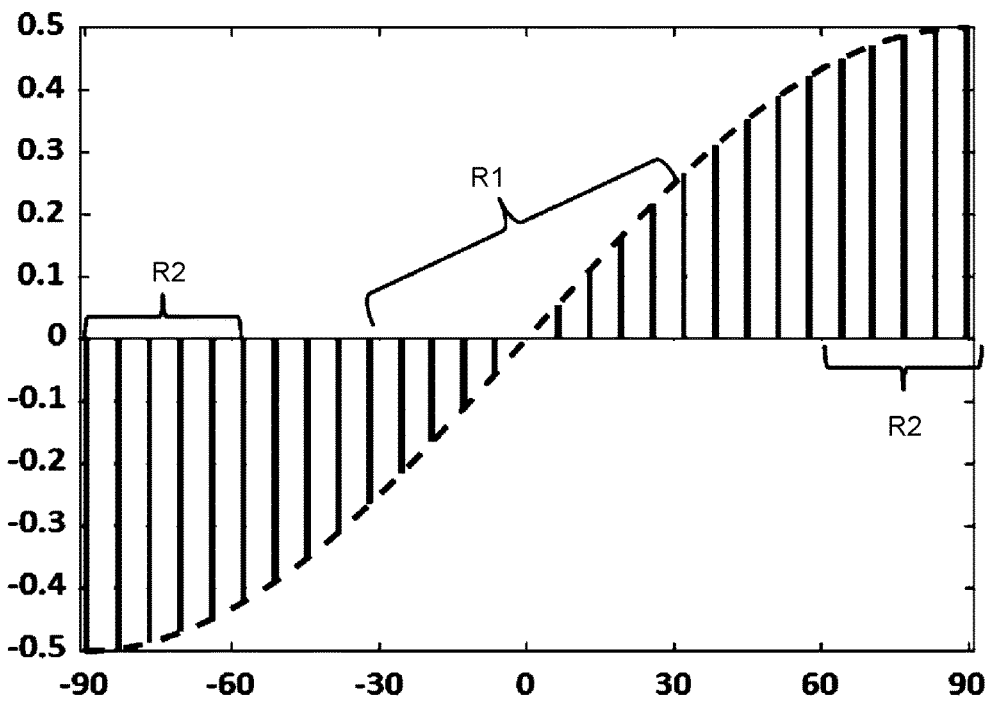
Figure 9B:
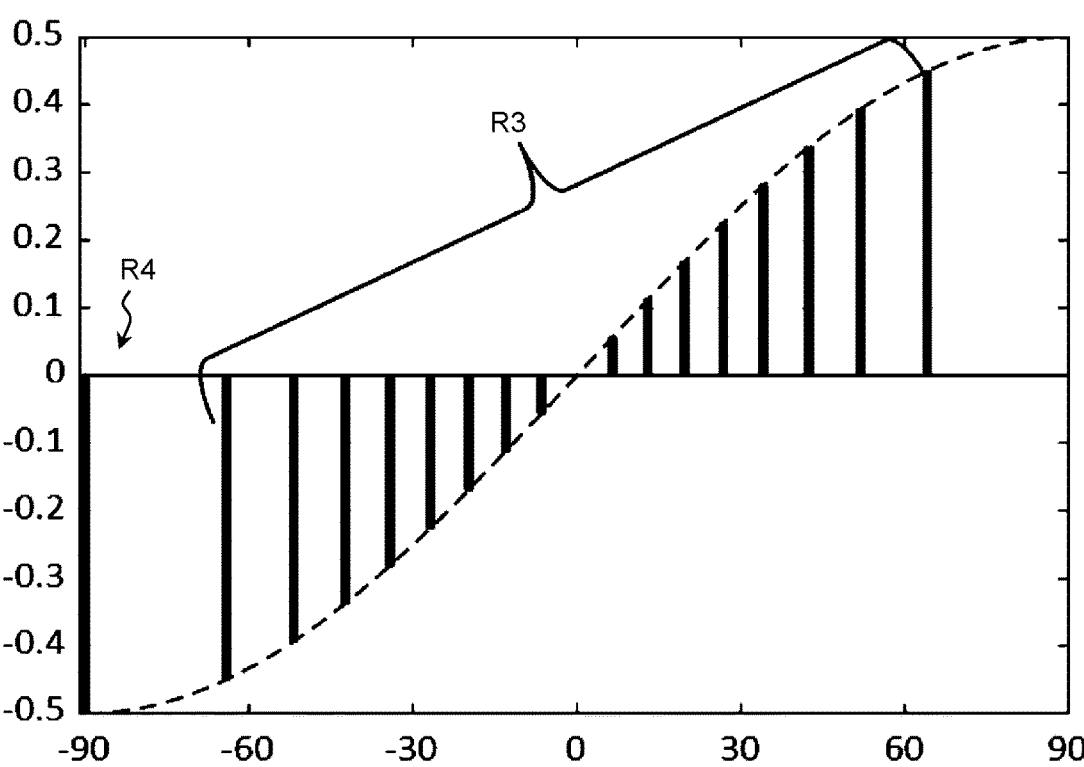

In the following, exemplary aspects and embodiments related to a comparison of beam sweeping methods and an associated overhead are disclosed. An exemplary comparison of traditional approaches and beam sweeping methods according to exemplary embodiments for a 16-element ULA with half-wavelength spacing is illustrated in FIG. 9A, 9B. To maintain a same beam overlapping along an array boresight direction (e.g., the most significant region), for N-element ULA, traditional beam sweeping would need roughly 1.7N beams where the proposed method only requires N+2 beams. This corresponds to 34% reduction in beam sweeping overhead.

FIG. 9A shows uniform sampling in an angular domain using about 1.7N beams with non-uniform beam overlapping ranging from −3 dB (see region R1) to −1 dB (see region R2).

FIG. 9B shows uniform sampling in the NAF domain using N+2 beams with uniform beam overlapping of −3 dB, see region R3, except for an extra beam probing at −90°, see region R4, e.g. to cover an entire [−90°,90° ] region, according to some embodiments.

In some embodiments, for URA, see, for example, FIG. 4, with an azimuth scan range of e.g. [−90°,90° ] and an elevation scan range of e.g. [−30°,30° ], about 2.6N beams may be used for traditional beam sweeping, in contrast to about 1.5N beams needed for the method according to the embodiments, which corresponds to about 42% reduction in beam sweeping overhead.

Note that, in some embodiments, the beam sweeping overhead could e.g. be, for example greatly, reduced when a rough direction of a serving UE 2 (FIG. 1) is known, either from prior knowledge (e.g., in a beam refinement stage, e.g. after SSB (synchronization signal block) broadcasting, or reconnecting an interrupted link) or from natural confinement such as e.g. in urban canyons where users (such as UE 2 of FIG. 1) are mostly positioned in an up/down the street direction.

Figure 10:
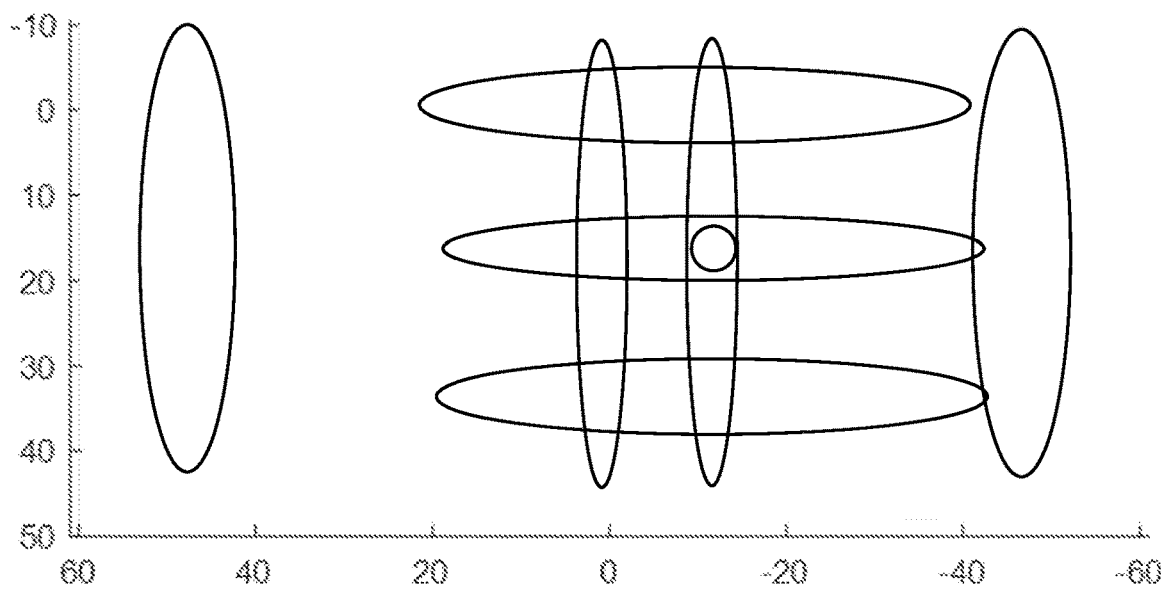

In the following, an exemplary implementation using a GoB-based phase array according to further embodiments is disclosed. An illustration of GoB-based beam sweeping is shown in FIG. 10. For an exemplary 16×16 URA array, e.g. similar to URA 10' of FIG. 4, an exemplary beam scan may use 18 tall-slim beams spacing 0.9/N apart in azimuth, 8 wide-slim beams spacing 0.9/N apart in elevation. In some embodiments, determination of ASD/ZSD may require an additional 3 fat GoB beams, e.g. 3 symmetric 60-deg HPBW beams in azimuth. As an example, in total, 29 predefined beams are used to determine a beam width and beam direction according to some embodiments.

In the following, exemplary embodiments and aspects related to beam direction estimation are disclosed.

Figures 11, 12:
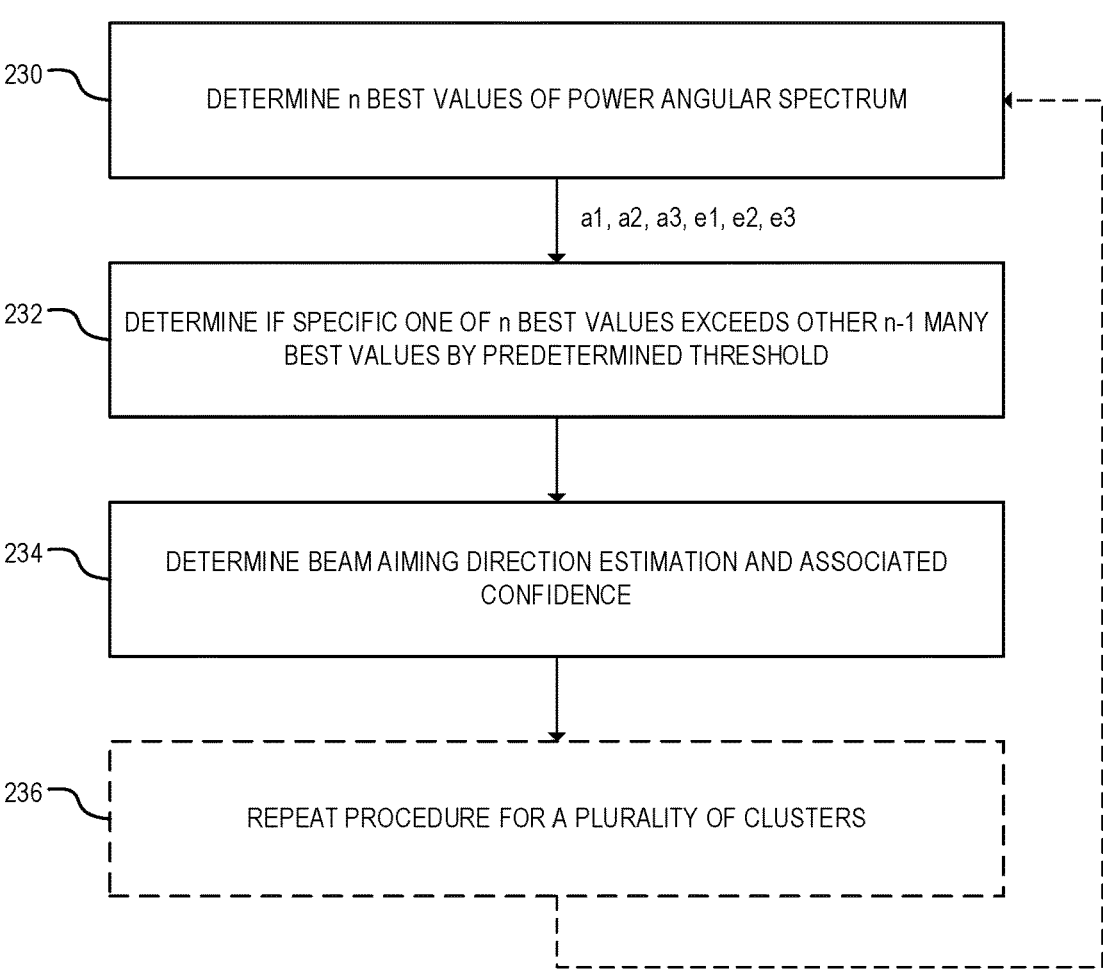

In some embodiments, FIG. 11, the instructions 106, when executed by the at least one processor 102, cause the apparatus 100 to determine 230 a predetermined number of n many best values a1, a2, a3, e1, e2, e3 associated with the power angular spectrum PAS (also see block 200 of FIG. 2, for example) for the predetermined angular range, determine 232 (FIG. 11) if a specific one of the n many best values exceeds the other n−1 many best values by a predetermined threshold, determine 234 the beam aiming direction estimation and the associated confidence based on the determination 232.

In some embodiments, FIG. 11, the instructions 106, when executed by the at least one processor 102, cause the apparatus 100 to repeat 236 the steps of determining 230, 232, 234 for a plurality of clusters of beams associated with the power angular spectrum PAS. In some embodiments, this e.g. enables to determine respective best beam aiming direction estimates and an associated confidence for several clusters of beams.

In some embodiments, a direction estimation, e.g. determination of beam aiming direction and its associated confidence may be performed as follows, wherein one or more of the following three approximations may be used: 1. Azimuth and elevation directions are decoupled. 2. Power angular spectrum PAS (or its discrete sample set, for example), after normalization, can e.g. be treated as mass distribution in angular domain. 3. Gaussian shaped beam and angular spread. In some embodiments, these approximations work well when tested using real beam patterns and angular spread randomizations, e.g. according to some accepted standard, which are, for example, not exactly Gaussian distributed.

Figure 13:
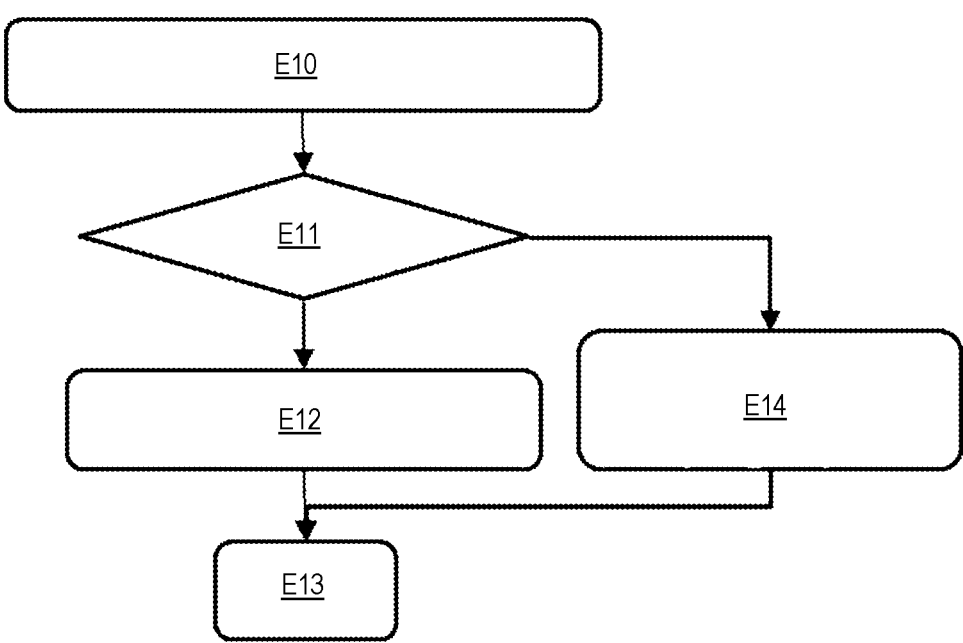

In some embodiments, the exemplary process of FIG. 13, explained in detail below, may be performed, e.g. for each cluster of beams as e.g. identified based on a beam sweeping procedure, e.g. as disclosed above. Element E10 symbolizes obtaining at least n many, for example n=3, top (i.e., best) measurements in azimuth (a1, a2, a3, . . . ) and in elevation (e1, e2, e3, . . . ), e.g. based on the power angular spectrum PAS. In some embodiments, if the 2nd and 3rd best signals or measurements, respectively, are too weak as compared to the 1st signal or measurement (e.g., differ from the 1st signal by more than a predetermined threshold), see the determination block E11, then, in block E14, the best signal/ measurement in azimuth and elevation, e.g. (a1, e1), may be set as the aiming direction, and half of the angular domain sampling step size is set as confidence interval; otherwise, the procedure continues with block E12. Block E12 symbolizes determining a mean aiming direction, e.g. by treating the measurements as obtained by block E10 as samples of a mass distribution in angular domain: $a_0=(\Sigma a_k P_k)/(\Sigma P_k)$, $e_0=(\Sigma e_k Q_k)/(\Sigma Q_k)$. In some embodiments, e.g. when the measurements are sparse, these measurements may e.g. be treated as samples from a Gaussian distribution. In some embodiments, it is proposed to calculate a confidence interval (e.g., 90-percentile), e.g. by assuming an unbiased estimation with Gaussian distributed error centered around (a0, e0). In some embodiments, this step may also be done by estimating (a0, e0) jointly, e.g. assuming a 2D Gaussian distribution. Element E13 symbolizes a termination of the procedure.

FIG. 12 illustrates an exemplary procedure as explained above with respect to FIG. 13. Elements 1_a1, 1_a2, 1_a3 symbolize respective first, second and third signals or measurements in an azimuth direction. Elements 1_e1, 1_e2, 1_e3 symbolize respective first, second and third signals or measurements in an elevation direction, and the element a0_e0 symbolizes a beam aiming direction as determined based on the exemplary procedure of FIG. 13 (e.g., for one cluster of beams).

In the following, further exemplary embodiments and aspects related to an extension to support hybrid beamforming with multiple concurrent beams are explained.

In some embodiments, FIG. 14, the instructions 106, when executed by the at least one processor 102, cause the apparatus 100 to determine 240 K many best clusters CLUST-K of beams associated with the power angular spectrum PAS (as e.g. obtained by the beam sweeping), determine 242, for each of the K many best clusters CLUST-K of beams, a corresponding aiming direction estimation DIR-EST-K and an associated confidence DIR-EST-CONF-K, determine 244, for each of the K many best clusters CLUST-K of beams, estimates ASD-EST-K, ZSD-EST-K for at least one of an azimuthal angular spread, ASD, and an elevation angular spread, ZSD, determine 246, for each of the K many best clusters CLUST-K of beams, a respective, e.g. best, beam BEAM-K.

Figure 15:
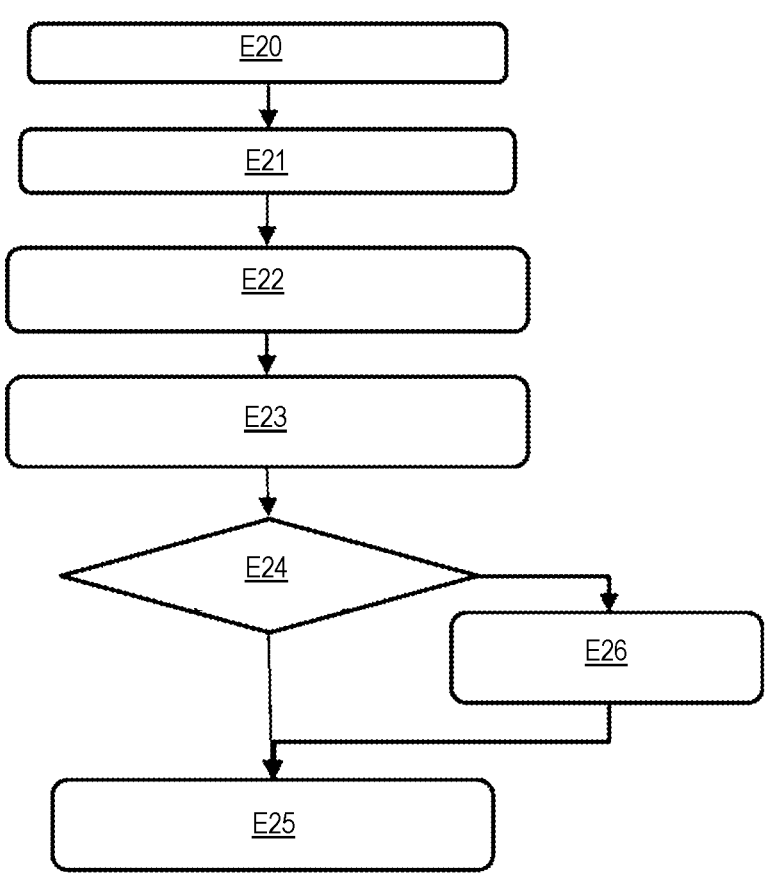

In further exemplary embodiments, a method of determining beam aiming direction and beam pattern according to some embodiments can e.g. be extended to hybrid beamforming, to support multiple concurrent beams. FIG. 15 depicts a further exemplary procedure for support hybrid beamforming in the aforementioned sense.

Element E20 symbolizes performing beam sweeping, for example two-dimensional (2D-) beam sweeping. Element E21 symbolizes identifying up to K best angular clusters (in some embodiments, K may e.g. be specified by some predefined conditions). Element E22 symbolizes estimating the beam aiming direction and its confidence, as well as ASD/ZSD, e.g. for each cluster. Element E23 symbolizes determine an ideal, e.g. best, beam (i.e., characterized by HPBWs and aiming direction) for each cluster. In some embodiments, if a beam as determined by element E23 is not possible, see the determination of block E24, the procedure continues with block E26, symbolizing finding a best GoB (i.e., possible) beam, e.g. with a highest estimated SNR, e.g. for each cluster. The optional block E25 symbolizes using the selected beams, e.g. to serve one or more UE 2 (FIG. 1).

Figure 16:
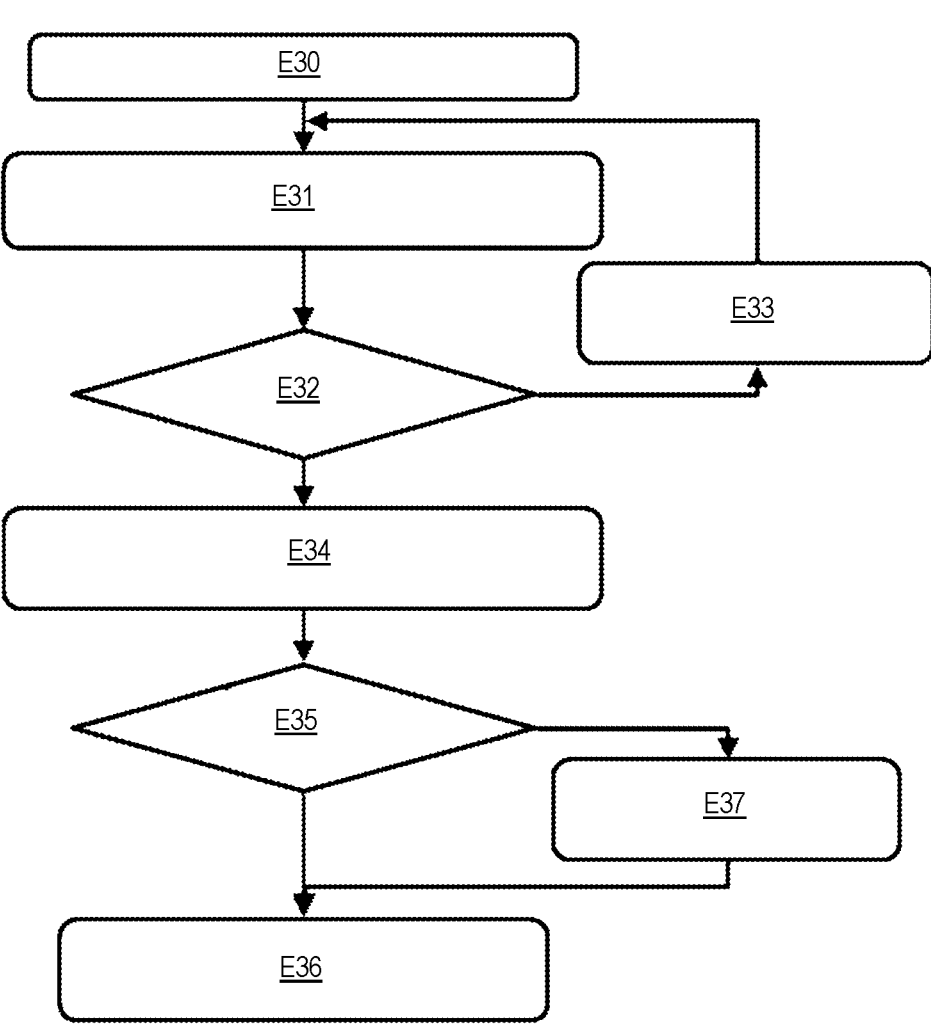

In some embodiments, the elements E21, E22 of FIG. 15 may also be performed in an iterative fashion, as exemplarily depicted by FIG. 16.

Similar to element E20 of FIG. 15, element E30 of FIG. 16 symbolizes performing beam sweeping, for example two-dimensional (2D-) beam sweeping. Element E31 of FIG. 16 symbolizes estimating the beam aiming direction and its confidence, as well as ASD/ZSD, e.g. for the best cluster. Element E32 symbolizes whether predetermined conditions are met for the previously determined best cluster. If not, the procedure continues with element E33, symbolizing removing the identified cluster. If yes, the procedure continues with element E34 symbolizing the beam (i.e., characterized by HPBWs and aiming direction) for each cluster. Element E35 symbolizes determining whether respective beams are available. If not, the procedure continues with block E37, symbolizing finding best GoB (i.e., possible) beams, e.g. with a highest estimated SNR, e.g. for each cluster. The optional block E36 symbolizes using the selected beams, e.g. to serve one or more UE 2 (FIG. 1).

In some embodiments, one or more of the following conditions may be used, e.g. for stopping a cluster-wise estimation/processing: a) Discovered number of clusters equals number of supported concurrent beams, e.g. a number of digital chains of a hybrid array. b) Residual power is below a predefined percentage threshold (e.g., 10%). c) Peak power of remaining clusters is below a predefined threshold (e.g., <3 dB above noise).

In the following, further exemplary embodiments and aspects e.g. related to joint beam aiming and beam shape optimization, e.g. by accounting for angular spread and/or beam misalignment, are disclosed.

In some embodiments, without loss of generality, it is focused on an exemplary case of a single UE 2 (FIG. 1), where a gNB 1 e.g. points its beam (not shown) with a nominal half-power beamwidth (HPBW$_\varphi$, HPBW$_\theta$) towards the direction of the UE 2 with $\Delta_\varphi$ angular misalignment in azimuth and with $\Delta_\theta$ angular misalignment in elevation. In some embodiments, ASD and ZSD are denoted as the Root Mean Square (RMS) angular spread in azimuth and in elevation, respectively.

Figure 6:
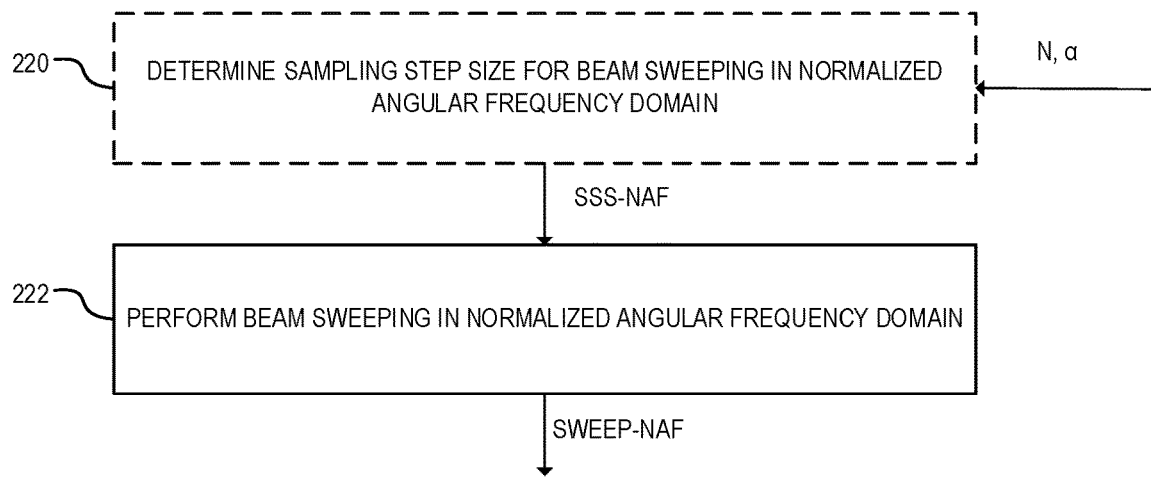

Exemplary flow charts related to exemplary embodiments e.g. for joint beam aiming and beam shape optimization have been explained above, e.g. with respect to FIG. 2 and FIG. 5. In some embodiments, the power angular spectrum PAS may e.g. be obtained after beam sweeping, e.g. using the exemplary approach proposing beam sweeping in the NAF domain, cf. FIG. 6, or directly using a sampled power angular spectrum from the beam sweeping.

In some embodiments, the RMS beamwidth of a beam is defined as the standard deviation (SD) of power distribution around its boresight direction of the main beam of a nominal antenna pattern, which, in some embodiments, may be well approximated by a Gaussian function. In some embodiments, a simplified method to derive RMS beamwidth from its half-power beamwidth (HPBW$_\varphi$, HPBW$_\theta$) is based on $\mu_\varphi$=HPBW$_\varphi$/(2$\sqrt{\ln(4)}$), $\mu_\theta$=HPBW$_\theta$/(2$\sqrt{\ln(4)}$).

In some embodiments, without beam misalignment, ($\Delta_\varphi$, $\Delta_\theta$)=(0,0), an effective directional gain of the beam with RMS beamwidth ($\mu_\varphi$, $\mu_\theta$) under angular spread (ASD, ZSD) may be written as $$G(0, 0) = \frac{2}{\sqrt{(\mu_\varphi^2 + ASD^2)(\mu_\theta^2 + ZSD^2)}},$$

which may e.g. be derived based on an approximation of Gaussian shaped main beam pattern and channel angular spread distribution. Here, $$\sqrt{\mu_\varphi^2 + ASD^2} \text{ and } \sqrt{\mu_\theta^2 + ZSD^2}$$

can be regarded as the effective beamwidth in azimuth and in elevation, respectively. Note that in some embodiments it is assumed that azimuth and elevation are independent, thus two independent Gaussian functions may be considered. In some embodiments, an extension to bivariate Gaussian functions is also possible, e.g. by modeling inter-dependencies between azimuth and elevation in beam pattern and/or angular spread, where the effective gain without beam misalignment may be, e.g., written as $$G(0, 0) = \frac{2}{\sqrt{(1 - \rho^2)(\mu_\varphi^2 + ASD^2)(\mu_\theta^2 + ZSD^2)}},$$

wherein $\rho$ is the correlation between effective beamwidth in azimuth and in elevation.

In some embodiments, with a non-vanishing beam misalignment $\Delta_\varphi$ in azimuth and/or $\Delta_\theta$ in elevation, a realized effective gain $G(\Delta_\varphi,\Delta_\theta)$ may be degraded from the effective gain $G(0,0)$ obtained when aiming at the true direction. In some embodiments, the effective beam pattern, e.g. after widened by the channel angular spread, can therefore e.g. also be approximated by a Gaussian distribution. Therefore, in some embodiments, a misalignment penalty may be determined, for the case where independent Gaussian beam shape approximation is well established, e.g. given by, $$G(\Delta_\varphi, \Delta_\theta) = G(0, 0)e^{-\frac{\Delta_\varphi^2}{2(\mu_\varphi^2 + ASD^2)}} e^{-\frac{\Delta_\theta^2}{2(\mu_\theta^2 + ZSD^2)}}.$$

In some embodiments, an extension of the above equation to a case where beam pattern and angular spread may be better described by bivariate Gaussian functions is also possible, e.g., given by $$G(\Delta_\varphi, \Delta_\theta) = G(0, 0)e^{-\frac{1}{2(1-\rho^2)}\left[\frac{\Delta_\varphi^2}{(\mu_\varphi^2 + ASD^2)} + \frac{\Delta_\theta^2}{(\mu_\theta^2 + ZSD^2)} - \frac{2\rho\Delta_\varphi\Delta_\theta}{\sqrt{(\mu_\varphi^2 + ASD^2)(\mu_\theta^2 + ZSD^2)}}\right]}.$$

Note that in some embodiments, the effective gain with no beam misalignment, $G(0,0)$, decreases monotonically with increasing beamwidth ($\mu_\varphi$, $\mu_\theta$). That is, a narrower beam has higher effective gain. In some embodiments, the beam misalignment penalty, on the other hand, becomes larger when a narrower beam is used. In some embodiments, these conflicting requirements on beam width can efficiently be addressed by the principle according to the embodiments, enabling e.g. a joint optimization based on a given channel angular spread and beam direction estimations and associated confidence, such that e.g. an expected effective gain $G(\Delta_\varphi,\Delta_\theta)$ may be maximized.

In some embodiments, e.g. since beam misalignment $(\Delta_\varphi,\Delta_\theta)$ are the result of a noisy direction estimation, they can be considered as random variables. Therefore, in some embodiments, different objective functions OBJ-FUNCT (also see for example FIG. 3) to be maximized may be formulated, e.g. depending on an availability of estimation confidence statistics and/or a desired complexity-performance tradeoff.

In the following, several exemplary implementation alternatives according to further exemplary embodiments are explained.

In some embodiments, a formulation of the Objective Function OBJ-FUNCT for a case with a single dominant arrival cluster is proposed as follows.

Case 1: In some embodiments, if the distribution $p(\Delta_\varphi,\Delta_\theta)$ of the beam misalignment $(\Delta_\varphi,\Delta_\theta)$ is known, e.g. from a direction estimation step, the objective function (also denoted as "obj" in the following example embodiments) can e.g. be formulated as an expected effective gain by averaging over the distribution:

$$\text{obj} = \iint G(\Delta_\varphi,\Delta_\theta)p(\Delta_\varphi,\Delta_\theta)d\Delta_\varphi d\Delta_\theta.$$

Similarly, if the distribution $p(\Delta_\varphi,\Delta_\theta)$, is unknown, but an approximation such as a histogram is known, the above integration may e.g. be replaced by a finite summation:

$$obj = \sum_i G(\Delta_{\varphi,i}, \Delta_{\theta,i})p(\Delta_{\varphi,i}, \Delta_{\theta,i}).$$

Case 2: In some embodiments, if the estimation bias and RMS error are known but the distribution $p(\Delta_\varphi,\Delta_\theta)$ or its approximation is unknown, $p(\Delta_\varphi,\Delta_\theta)$ may e.g. be approximated by two independent Gaussian distributions (one for azimuth and the other for elevation), e.g. by setting its mean as the bias and (RMS error)^2 as its variance, and then the objective function may e.g. be formulated as explained above in Case 1. As noted above, in some embodiments, $p(\Delta_\varphi,\Delta_\theta)$ may also be approximated by a bivariate Gaussian distribution, e.g. modeling inter-dependencies between azimuth and elevation misalignments.

Case 3: In some embodiments, e.g. if a the certain confidence interval of $(\Delta_\varphi,\Delta_\theta)$ is known (90th percentile, for example), or if some empirical confidence measures are known, one may substitute such numbers, e.g. denoted as $(\underline{\Delta_\varphi},\underline{\Delta_\theta})$, into the effective directional gain and may use $G(\underline{\Delta_\varphi},\underline{\Delta_\theta})$ as the objective function.

In some embodiments, a formulation of the objective function OBJ-FUNCT for a case with multiple dominant arrival clusters is proposed as follows.

In some embodiments, it is assume that there are m=1, . . . , M dominant clusters, each cluster with its cluster central direction at $(\varphi_m,\theta_m)$. In some embodiments, determining the number of dominant clusters may e.g. be done heuristically, e.g. using criteria or conditions described above. Let $(\varphi_t,\theta_t)$ denote the targeting beam direction and $(\varphi_0,\theta_0)$ be the best aiming direction as e.g. identified in block 202 of FIG. 2. In some embodiments, the objective function may e.g. be written as $$obj = \sum_{m=0, \ldots ,M} obj(\varphi_t - \varphi_m, \theta_t - \theta_m).$$

In some embodiments, if the distribution $p(\Delta_\varphi,\Delta_\theta)$ would be known or would be approximated by a continuous function, the objective function could be written as $$obj = \sum_{m=0, \ldots ,M} obj(\varphi_t - \varphi_m, \theta_t - \theta_m) =$$

$$\iint \sum_{m=0, \ldots ,M} G(\Delta_\varphi + abs(\varphi_t - \varphi_m), \Delta_\theta + abs(\theta_t - \theta_m))p(\Delta_\varphi, \Delta_\theta)d\Delta_\varphi d\Delta_\theta.$$

In some embodiments, if a discrete approximation of the distribution $p(\Delta_\varphi,\Delta_\theta)$ is known, the objective function may e.g. be written as $$obj = \sum_{m=0,\ldots,M} \sum_i G(\Delta_{\varphi,i} + \text{abs}(\varphi_t - \varphi_m), \Delta_{\theta,i} + \text{abs}(\theta_t - \theta_m))p(\Delta_{\varphi,i}, \Delta_{\theta,i}).$$

In some embodiments, solving the abovementioned optimization problem may be performed as follows.

Since the RMS beamwidth ($\mu_\varphi$, $\mu_\theta$) and the half-power beamwidth (HPBW$_\varphi$, HPBW$_\theta$) are both constrained by an array size (and e.g. by a codebook, e.g. for a GoB-based implementation), in some embodiments, the variable space of ($\mu_\varphi$, $\mu_\theta$) is constrained by their respective lower bound (e.g., a narrowest beamwidth is determined by an aperture of the array 10' (FIG. 2)). In some embodiments, an upper bound on beamwidth may e.g. be derived from a beam pattern of an individual antenna element 12-1-1 (FIG. 4) (such as e.g. the pattern of a patch in phased array). In some embodiments, this constrained optimization problem may e.g. be solved by carrying out two parallel one-dimensional exhaustive searches, since the variable space is discrete and finite, with clear upper and lower bounds. In some embodiments, in case of bivariate Gaussian distributions, two parallel one-dimensional searches may e.g. be suboptimal compared to a single, joint two-dimensional (2D) search. Nevertheless, in some embodiments, the two simpler one-dimensional searches may give a good starting point for a joint 2D search.

In some embodiments, one may also first solve the constrained problem, e.g. using efficient optimization toolboxes, e.g. by assuming a continuous beamwidth variable. Then, in some embodiments, one can select an available beam pattern that is closest to the determined solution of the continuous optimization problem.

Figure 17:
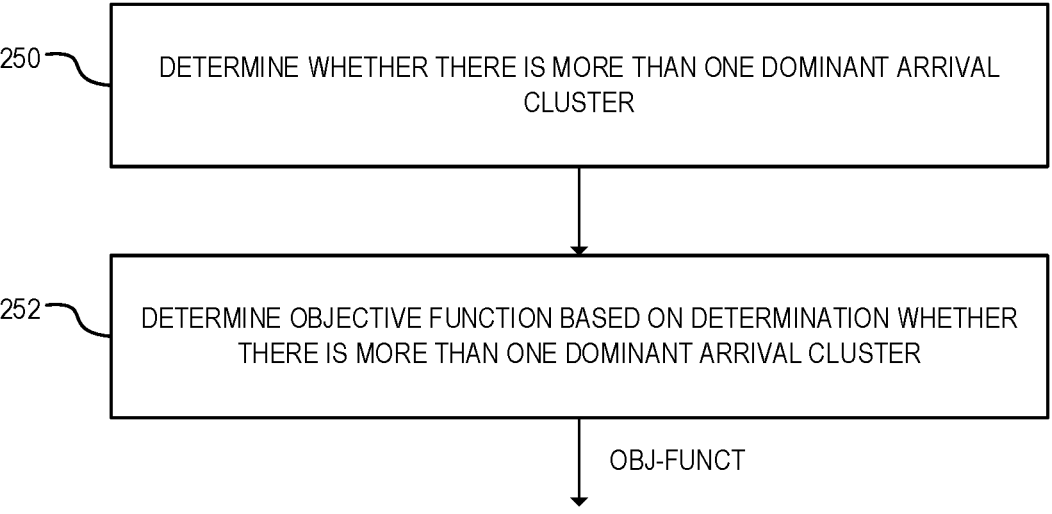

In some embodiments, FIG. 17, the instructions 106, when executed by the at least one processor 102, cause the apparatus 100 to determine 250, based on the power angular spectrum PAS, whether there is more than one dominant arrival cluster associated with the power angular spectrum PAS, and to determine 252 the objective function OBJ-FUNCT based on the determination 250 whether there is more than one dominant arrival cluster. In some embodiments, this enables to select a suitable objective function for each of the different operational cases, as e.g. explained above.

Figure 18:
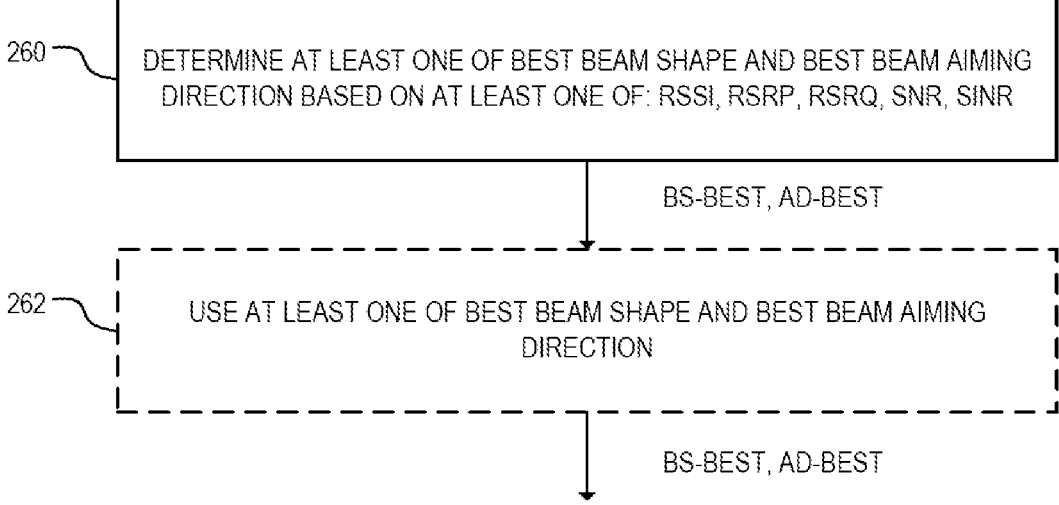

In some embodiments, FIG. 18, the instructions 106, when executed by the at least one processor 102, cause the apparatus 100 to determine 260 at least one of the best beam shape BS-BEST and the best beam aiming direction AD-BEST based on at least one of the following elements: a) Reference Signal Strength Indicator, RSSI, b) Reference Signal Received Power, RSRP, c) Reference Signal Received Quality, RSRQ, d) Signal to Noise Ratio, SNR, e) Signal to Interference plus Noise Ratio, SINR. The optional block 262 symbolizes using at least one of the best beam shape BS-BEST and the best beam aiming direction AD-BEST as determined by block 260, e.g. for a procedure according to FIG. 2.

Figure 19:
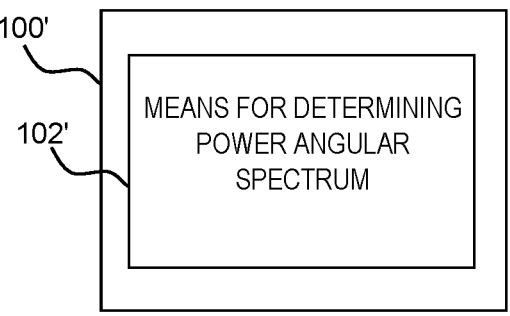

Further exemplary embodiments, FIG. 19, relate to an apparatus 100' comprising means 102' for determining 200 (FIG. 2) a power angular spectrum PAS characterizing a power distribution associated with an antenna array in a predetermined, for example one-dimensional or two-dimensional, angular range, determining 202 a beam aiming direction estimation and an associated confidence, determining 204 estimates for an azimuthal angular spread, ASD, and an elevation angular spread, ZSD, determining 206 a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread.

Further exemplary embodiments, FIG. 2, relate to a method comprising: determining 200 a power angular spectrum characterizing a power distribution associated with an antenna array in a predetermined angular range, determining 202 a beam aiming direction estimation and an associated confidence, determining 204 estimates for an azimuthal angular spread, ASD, and an elevation angular spread, ZSD, determining 206 a best beam shape and best beam aiming direction according to a predetermined criterion based on at least one of a) the power angular spectrum, b) the beam aiming direction estimation and the associated confidence, c) the estimate for the azimuthal angular spread, d) the estimate for the elevation angular spread.

Further exemplary embodiments relate to a device 1 (FIG. 1) for wireless applications, comprising at least one apparatus 100, 100' according to the embodiments. In some embodiments, the device 1 may e.g. be provided for, e.g. within, a base state, e.g. gNB, of a communications system 5. In some embodiments, the device 1 may e.g. be provided for, e.g. within, a terminal device 2 of a communications system 5.

Further exemplary embodiments, FIG. 1, relate to a data carrier signal DCS carrying and/or characterizing the instructions 106 according to the embodiments. In some embodiments, the instructions 106 may e.g. be provided in the form of at least one computer program.

Further exemplary embodiments, FIG. 1, relate to a wireless communication system 5 comprising at least one device 1 according to the embodiments.

Further embodiments, FIG. 1, relate to a computer program or computer program product comprising instructions 106 which, when the program is executed by a computer, cause the computer to carry out the method according to the embodiments.

The invention claimed is:

1. An apparatus, comprising:

at least one processor; and at least one memory storing instructions, the at least one memory and the instructions configured to, with the at least one processor, cause the apparatus to:

determine a power angular spectrum (PAS) characterizing a power distribution associated with an antenna array in a predetermined angular range;

determine a beam aiming direction estimation (DIR-EST) and an associated confidence (DIR-EST-CONF);

determine estimates (ASD-EST, ZSD-EST) for at least one of an azimuthal angular spread, ASD, and an elevation angular spread, ZSD;

determine a best beam shape (BS-BEST) and best beam aiming direction (AD-BEST) according to a predetermined criterion based on at least one of a) the power angular spectrum (PAS), b) the beam aiming direction estimation (DIR-EST) and the associated confidence (DIR-EST-CONF), c) the estimate (ASD-EST) for the azimuthal angular spread, d) the estimate (ZSD-EST) for the elevation angular spread;

determine, based on the power angular spectrum (PAS), whether there is more than one dominant arrival cluster associated with the power angular spectrum (PAS); and determine an objective function (OBJ-FUNCT) based on the determination, whether there is more than one dominant arrival cluster.

2. The apparatus according to claim 1, wherein the instructions, when executed by the at least one processor, cause the apparatus to:

Determine the objective function (OBJ-FUNCT) characterizing the best beam shape (BS-BEST) and the best beam aiming direction (AD-BEST) according to the predetermined criterion, determine the best beam shape (BS-BEST) and the best beam aiming direction (AD-BEST) based on the objective function (OBJ-FUNCT).

3. The apparatus according to claim 1, wherein the instructions, when executed by the at least one processor, cause the apparatus to perform beam sweeping (SWEEP-NAF) in a normalized angular frequency domain.

4. The apparatus according to claim 3, wherein the normalized angular frequency domain is characterized by $\phi=\sin{(\theta)}/2$, wherein $\phi$ is a normalized angular frequency, wherein $\theta$ characterizes an angle between a boresight direction and a target direction.

5. The apparatus according to claim 3, wherein the instructions, when executed by the at least one processor, cause the apparatus to determine a sampling step size (SSS-NAF) for the beam sweeping (SWEEP-NAF) in the normalized angular frequency domain based on a number (N) of antenna elements and a scaling parameter ($\alpha$) associated with a desired overlap threshold.

6. The apparatus according to claim 1, wherein the instructions, when executed by the at least one processor, further cause the apparatus to:

determine a predetermined number of n many best values associated with the power angular spectrum (PAS) for the predetermined angular range;

determine if a specific one of the n many best values exceeds the other n−1 many best values by a predetermined threshold; and determine the beam aiming direction estimation (DIR-EST) and the associated confidence (DIR-EST-CONF) based on the determination.

7. The apparatus according to claim 6, wherein the instructions, when executed by the at least one processor, cause the apparatus to:

repeat the steps of determining the predetermined number of n many best values associated with the power angular spectrum (PAS) for the predetermined angular range;

determine if a specific one of the n many best values exceeds the other n−1 many best values by a predetermined threshold; and determine the beam aiming direction estimation (DIR-EST) and the associated confidence (DIR-EST-CONF) based on the determination, for a plurality of clusters of beams associated with the power angular spectrum (PAS).

8. The apparatus according to claim 1, wherein the instructions, when executed by the at least one processor, further cause the apparatus to:

determine K many best clusters (CLUST-K) of beams associated with the power angular spectrum (PAS);

determine, for each of the K many best clusters of beams, a corresponding aiming direction estimation (DIR-EST-K) and an associated confidence (DIR-EST-CONF-K);

determine, for each of the K many best clusters of beams, estimates (ASD-EST-K, ZSD-EST-K) for at least one of an azimuthal angular spread, ASD, and an elevation angular spread, ZSD; and determine, for each of the K many best clusters of beams, a respective beam (BEAM-K).

9. The apparatus according to claim 1, wherein the instructions, when executed by the at least one processor, further cause the apparatus to determine at least one of the best beam shape (BS-BEST) and the best beam aiming direction (AD-BEST) based on at least one of the following elements: a) Reference Signal Strength Indicator, RSSI, b) Reference Signal Received Power, RSRP, c) Reference Signal Received Quality, RSRQ, d) Signal to Noise Ratio, SNR, e) Signal to Interference plus Noise Ratio, SINR.

10. A method comprising:

determining a power angular spectrum (PAS) characterizing a power distribution associated with an antenna array in a predetermined angular range;

determining a beam aiming direction estimation (DIR-EST) and an associated confidence (DIR-EST-CONF);

determining estimates (ASD-EST, ZSD-EST) for an azimuthal angular spread, ASD, and an elevation angular spread, ZSD;

determining a best beam shape (BS-BEST) and best beam aiming direction (AD-BEST) according to a predetermined criterion based on at least one of a) the power angular spectrum (PAS), b) the beam aiming direction estimation (DIR-EST) and the associated confidence (DIR-EST-CONF), c) the estimate (ASD-EST) for the azimuthal angular spread, d) the estimate (ZSD-EST) for the elevation angular spread;

determining, based on the power angular spectrum (PAS), whether there is more than one dominant arrival cluster associated with the power angular spectrum (PAS); and determining an objective function (OBJ-FUNCT) based on the determination, whether there is more than one dominant arrival cluster.

11. A device for wireless applications, comprising at least one apparatus comprising:

at least one processor; and at least one memory storing instructions, the at least one memory and the instructions configured to, with the at least one processor, cause the apparatus to:

determine a power angular spectrum (PAS) characterizing a power distribution associated with an antenna array in a predetermined angular range, determine a beam aiming direction estimation (DIR-EST) and an associated confidence (DIR-EST-CONF);

determine estimates (ASD-EST, ZSD-EST) for at least one of an azimuthal angular spread, ASD, and an elevation angular spread, ZSD;

determine a best beam shape (BS-BEST) and best beam aiming direction (AD-BEST) according to a predetermined criterion based on at least one of a) the power angular spectrum (PAS), b) the beam aiming direction estimation (DIR-EST) and the associated confidence (DIR-EST-CONF), c) the estimate (ASD-EST) for the azimuthal angular spread, d) the estimate (ZSD-EST) for the elevation angular spread;

determine, based on the power angular spectrum (PAS), whether there is more than one dominant arrival cluster associated with the power angular spectrum (PAS); and determine an objective function (OBJ-FUNCT) based on the determination, whether there is more than one dominant arrival cluster.

12. A wireless communication system comprising at least one device according to claim 11.

* * * * *